United States Patent [19]
Nagakura

[11] Patent Number: 5,877,701
[45] Date of Patent: Mar. 2, 1999

[54] RADIO PAGER REPORTING FREQUENCY BAND INFORMATION

[75] Inventor: Tomio Nagakura, Shizuoka, Japan

[73] Assignee: NEC Corporation, Tokyo, Japan

[21] Appl. No.: 718,844

[22] Filed: Sep. 24, 1996

[30] Foreign Application Priority Data

Sep. 26, 1995 [JP] Japan .................................. 7-247698

[51] Int. Cl.[6] .................................................. H04Q 7/18
[52] U.S. Cl. .............................. 340/825.44; 340/825.03; 340/311.1; 455/151.2; 455/186.1; 455/165.1; 455/260; 455/160.1; 455/183.2; 370/314
[58] Field of Search ................... 340/825.44, 825.03, 340/311.1, 825.69; 455/71, 161.2, 166.2, 186.1, 185.1, 161.1, 165.1, 255, 32.1, 526, 517, 575, 434, 75, 76, 182.1, 183.1, 260, 160.1, 183.2, 195.1; 331/25; 334/16; 370/310, 312, 313, 314; 1/1

[56] References Cited

U.S. PATENT DOCUMENTS

| | | | |
|---|---|---|---|
| 3,671,870 | 6/1972 | Wellhausen | 455/195.1 X |
| 4,644,347 | 2/1987 | Lucas et al. | 340/825.44 X |
| 4,703,520 | 10/1987 | Rozanski, Jr. et al. | 455/75 |
| 4,978,944 | 12/1990 | Andros et al. | 340/825.44 |
| 5,058,204 | 10/1991 | Tahernia et al. | 455/183.1 |
| 5,170,487 | 12/1992 | Peek | 340/825.44 X |
| 5,170,492 | 12/1992 | Moller et al. | 455/76 |
| 5,262,769 | 11/1993 | Holmes | 340/825.44 X |
| 5,682,147 | 10/1997 | Eaton et al. | 340/825.03 |
| 5,689,806 | 11/1997 | Marko et al. | 455/161.2 X |

FOREIGN PATENT DOCUMENTS 2245733  1/1992  United Kingdom .

*Primary Examiner*—Brian Zimmerman
*Assistant Examiner*—William H. Wilson, Jr.
*Attorney, Agent, or Firm*—Sughrue, Mion, Zinn, Macpeak & Seas, PLLC

[57] ABSTRACT

A radio pager of the present invention includes a non-volatile memory storing frequency information for each of a plurality of frequency bands for the confirmation of a frequency band. The frequency information are sequentially read out of the memory while frequency signals respectively corresponding to the information are sequentially fed to a frequency synthesizer, until frequency lock is detected. The frequency band to which the locked frequency belongs is determined to be the frequency band assigned to the radio pager and is reported to the operator. Therefore, even before frequency information for allowing the synthesizer to output a desired oscillation frequency corresponding to a receipt frequency is written to the pager and when a frequency band particular to the pager is not labeled on the pager body, the operator can see the frequency band easily. This prevents the operator from writing frequency information in the ROM of an inadequate radio pager to which a desired frequency band is not assigned.

4 Claims, 8 Drawing Sheets

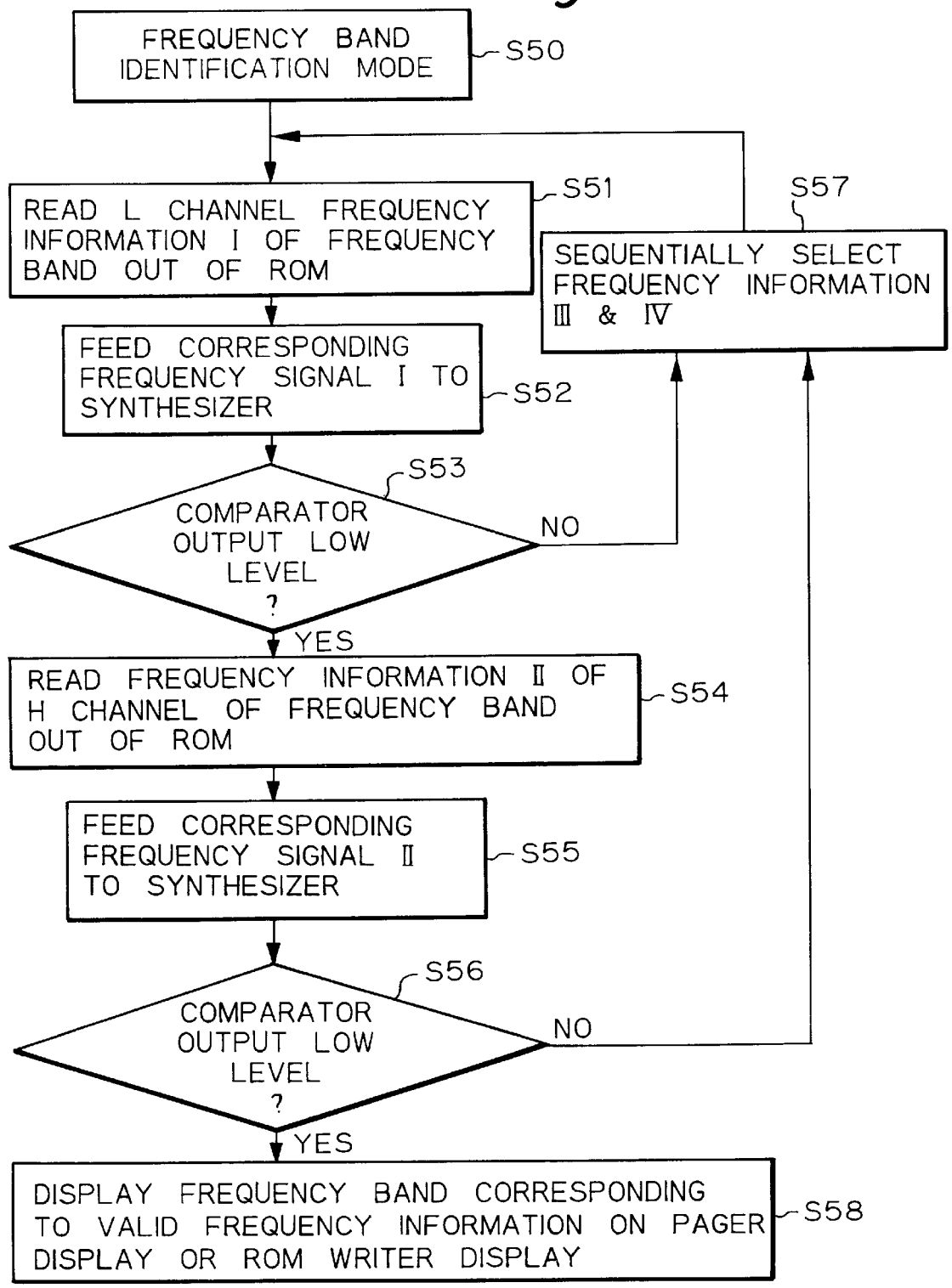

RADIO PAGER REPORTING FREQUENCY BAND INFORMATION

BACKGROUND OF THE INVENTION

The present invention relates to a radio pager adaptive to a plurality of frequency bands and, more particularly, to a radio pager capable of preventing frequency information for obtaining a desired oscillation frequency from being erroneously written thereto by identifying and reporting to a user a frequency band assigned to the radio pager before frequency information for producing a desired oscillation frequency corresponding to a reception frequency has been stored in the radio pager by an external source.

It is possible with a radio interface to obtain a radio paging service to use a plurality of different frequencies. Usually, a person intending to get the service selects one of the frequency bands in consideration of the service industry, the content of the service, and so forth and carries a radio pager adaptive to the frequency band selected. On the production line, all the radio pagers are provided with an identical basic circuit arrangement, appearance and structure, but only radio sections thereof including frequency synthesizers are each assigned to a particular frequency band. The frequency synthesizers each outputs an oscillation frequency (local oscillation frequency) adaptive to a particular receipt channel (channel frequency). After the channel or channels to be used and belonging to the frequency band have been determined, corresponding frequency information is written to a ROM (Read Only Memory). The frequency information is transformed to a frequency signal designating the oscillation frequency of the frequency synthesizer and then fed to the frequency synthesizer.

It is necessary with the above radio pagers of the same time and each being adaptive to a plurality of frequency bands with slight modification to identify the frequency band assigned to each radio pager. For the identification, it is a common practice to see a frequency printed on a label adhered to the body of the pager or to see a frequency previously stored in a ROM on a display by, e.g., pressing a button.

However, the problem is that when the frequency information is not written to the ROM, the frequency is, of course, not printed on the label of the pager body. In this condition, the operator must open the casing of the pager and see parts constituting the radio section. As a result, the operator is likely to write in the ROM frequency information other than the information actually meant for the ROM.

SUMMARY OF THE INVENTION

It is therefore an object of the present invention to provide a radio pager capable of allowing the operator to see a frequency band actually assigned to the pager easily so as to prevent frequency information meant for the pager from being written to a radio pager to which another frequency band is assigned.

In accordance with the present invention, a radio pager adaptive to a plurality of frequency bands and having no frequency information for producing an oscillation output of a desired frequency written therein includes a radio section including a frequency synthesizer adaptive to a particular frequency band. A non-volatile memory stores frequency information for confirmation for each of the plurality of frequency bands beforehand, and each corresponding to any frequency of the respective frequency band. A frequency lock detector determines whether or not the oscillation output of the frequency synthesizer has been locked at a frequency corresponding to a frequency signal input to the frequency synthesizer. A controller reads the frequency information of any one of the plurality of frequency bands out of the non-volatile memory and feeds the frequency signal representative of the frequency information, and repeats, if the frequency of the frequency synthesizer has not been locked in response to the frequency signal as determined by the frequency lock detector, the reading of another frequency information out of the non-volatile memory and the feeding of the frequency signal representative of the another frequency information to the frequency synthesizer, or determines and reports, if the frequency of the frequency synthesizer has been locked in response to the frequency signal, that the radio pager is adaptive to the frequency band represented by the frequency information.

BRIEF DESCRIPTION OF THE DRAWINGS

The above and other objects, features and advantages of the present invention will become apparent from the following detailed description taken with the accompanying drawings in which:

FIGS. 7, 8 and 9 are flowcharts each showing a particular operation derived from a specific configuration of the synthesizer.

DESCRIPTION OF THE PREFERRED EMBODIMENT

Figure 1:
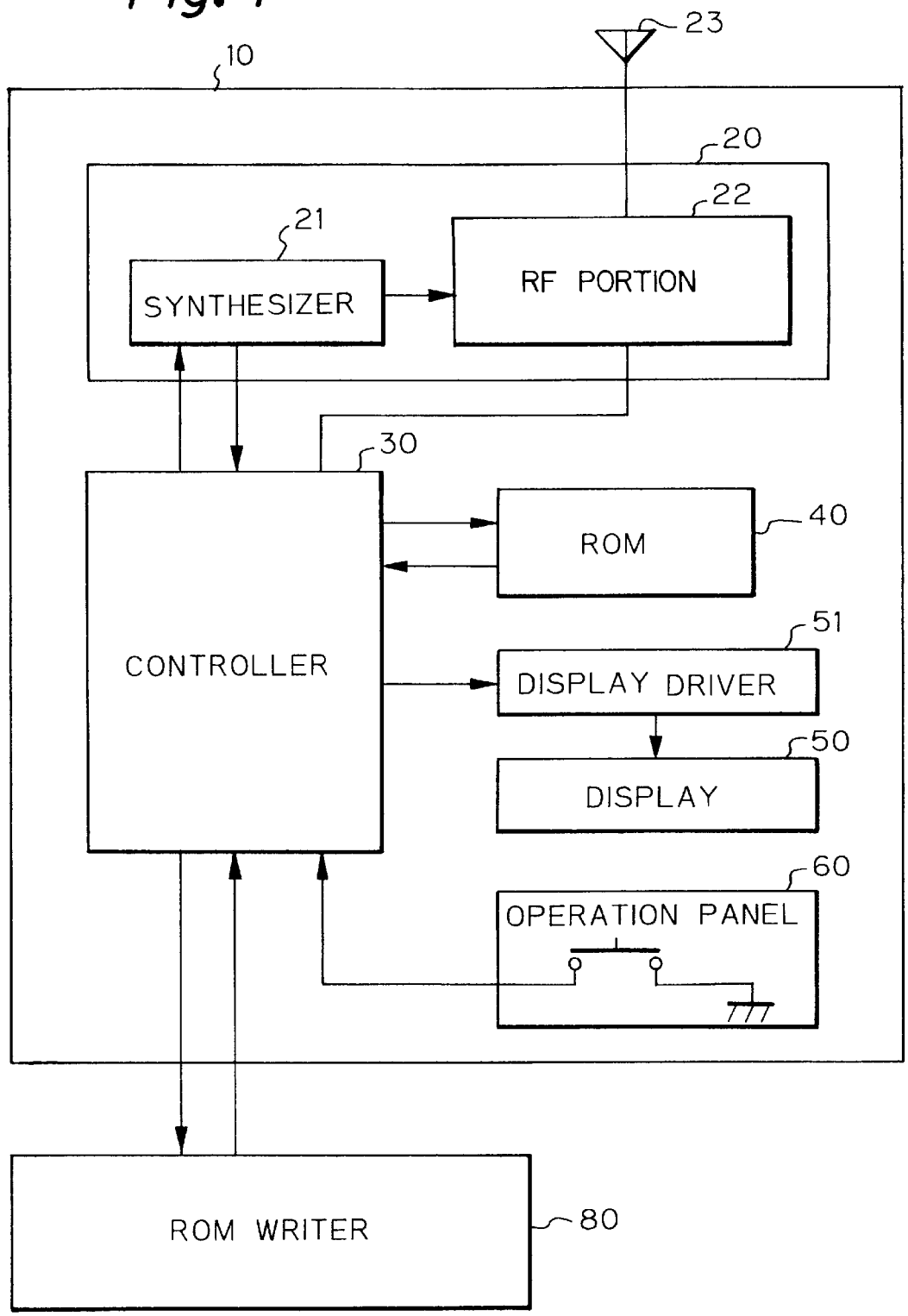
FIG. 1 is a block diagram schematically showing a radio pager embodying the present invention.

Referring to FIG. 1 of the drawings, a radio pager embodying the present invention is shown and generally designated by the reference numeral 10. As shown, the pager 10 includes a controller 30 for controlling the entire pager 10. A radio section or RF (Radio Frequency) section 20 has a synthesizer 21, an RF portion 22, and an antenna 23, and adapts itself to preselected one of a plurality of frequency bands. A ROM 40 stores one or two channels of frequency information for each of the frequency bands and used to confirm the frequency band, as will be described specifically later. A display 50 displays necessary information by being driven by a display driver 51. An operation panel 60 includes a push-button switch and is operated to enter desired information.

A ROM writer 80 is connected to the controller 30 when frequency information on the designated channel of the designated frequency band and other information necessary for communication should be written to the ROM 40. The synthesizer 21 is used to output a local oscillation frequency for converting the frequency (channel frequency) of the receipt channel to a superheterodyne IF (Intermediate Frequency). For this purpose, the synthesizer 21 is receives from the controller 30 a frequency signal designating the divisor of a frequency divider built in the synthesizer 21. The devisor corresponds to a local oscillation frequency based on the frequency information (channel frequency) stored on the ROM 40.

Figure 2:
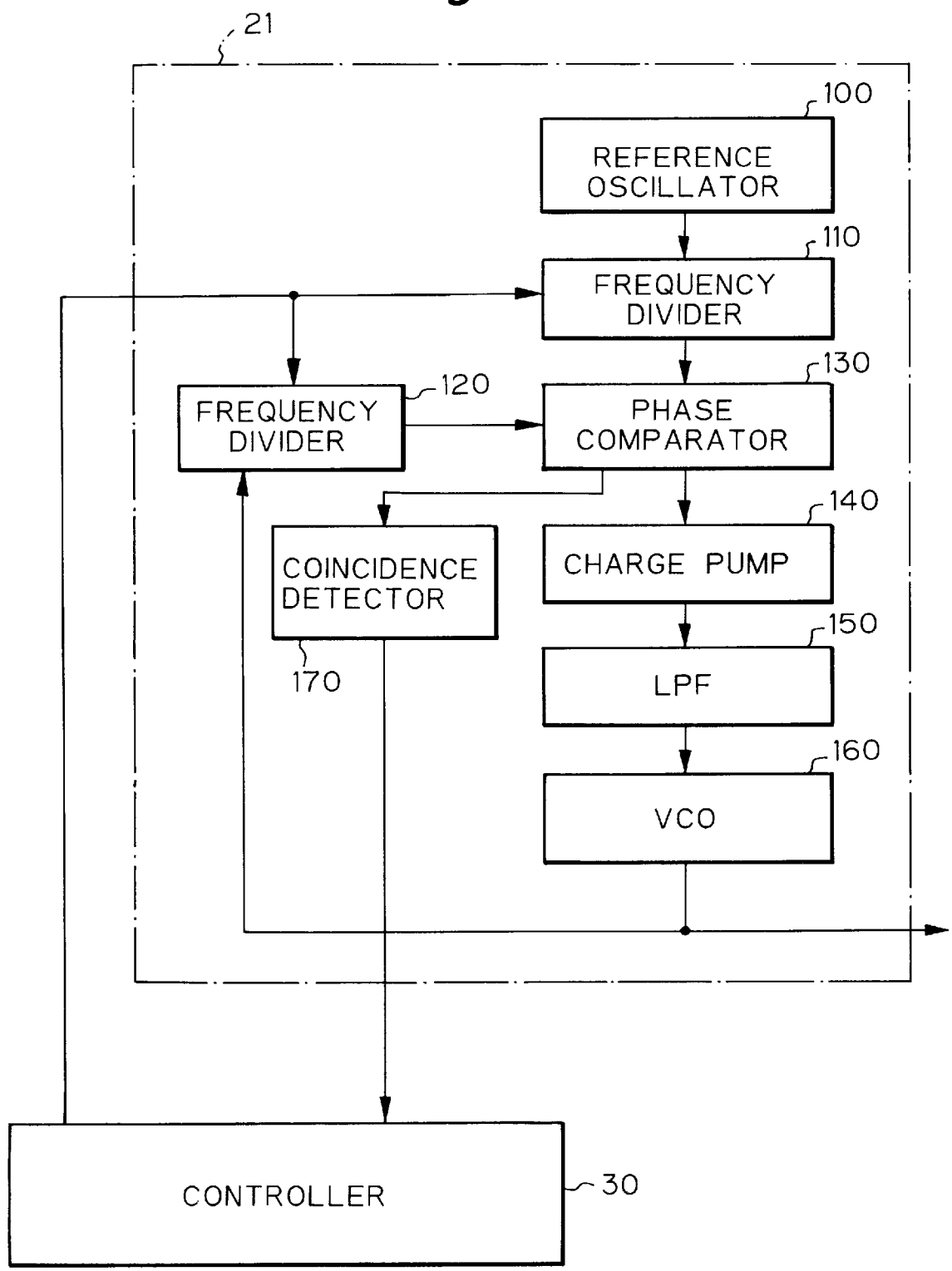
FIGS. 2, 3 and 4 are block diagrams each showing a particular configuration of a synthesizer included in the embodiment.

FIG. 2 shows a specific configuration of the synthesizer 10. As shown, a reference oscillator 100 outputs an oscillation signal having a reference frequency. A VCO (Voltage Controlled Oscillator) 160 produces an output having the final output frequency. The outputs of the reference oscillator 100 and VCO 160 are respectively divided by frequency dividers 110 and 120 by a divisor represented by the frequency signal output from the controller 30. A phase comparator 130 compares the divided frequencies output from the frequency dividers 110 and 120. The resulting output of the phase comparator 130 is routed through a charge pump 140 and an LPF (Low Pass Filter) 150 to the VCO 160 as a control voltage. As a result, the VCO 160 outputs a frequency corresponding to the input control voltage. A coincidence detector 170 constantly monitors the output of the phase comparator 130. The output of the coincidence detector 170 goes low if the phases of the two signals input to the phase comparator 130 are coincident, i.e., if the frequency is locked or goes high if it is not locked.

Figure 3:
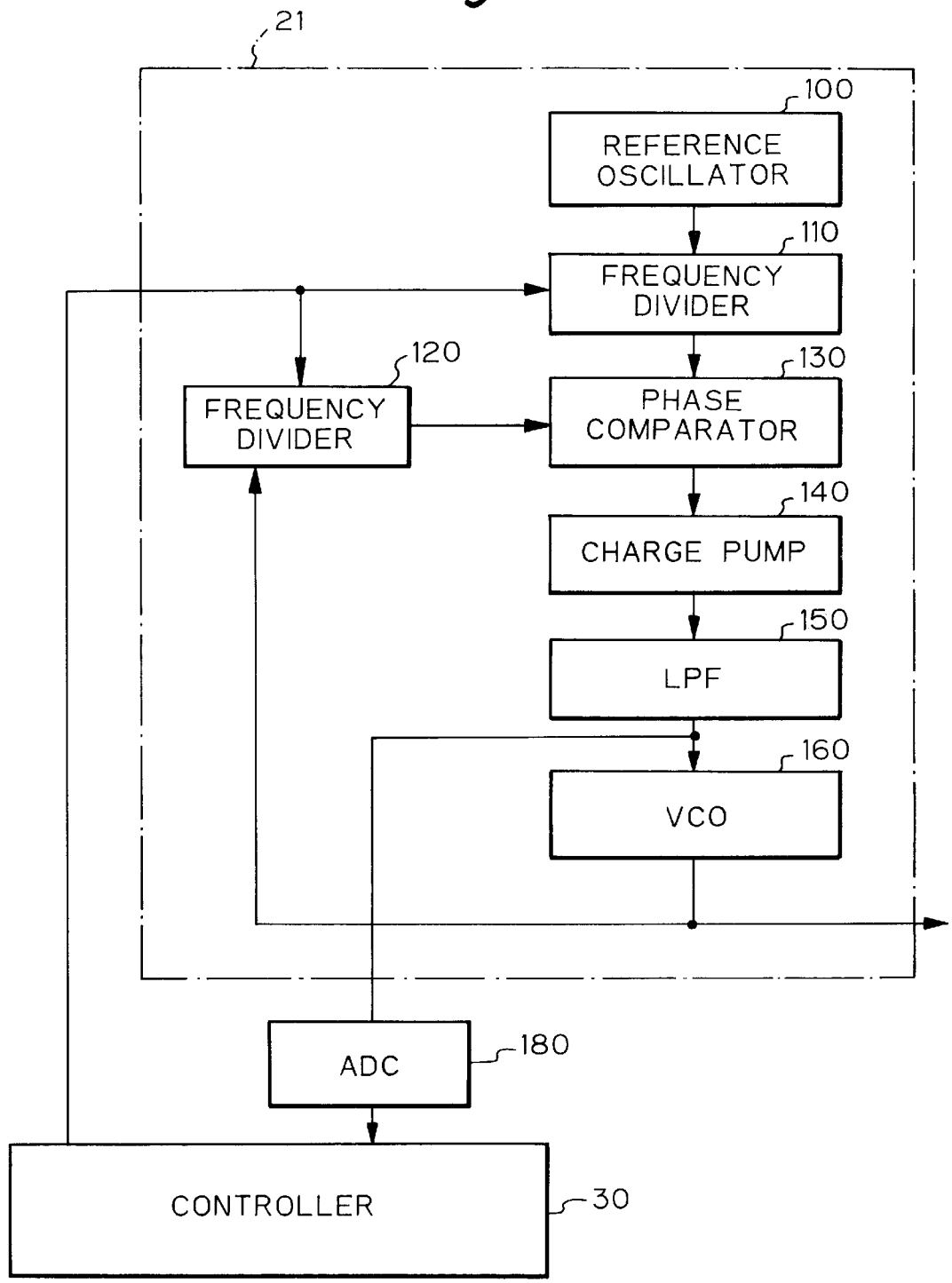

Another specific configuration of the synthesizer 21 is shown in FIG. 3. As shown, this configuration is similar to the configuration of FIG. 2 except that the coincidence detector 170 is absent, and that an analog-to-digital converter (ADC) 180 is added in order to digitize the analog control voltage fed from the LPF 150 to the VCO 160 and feed the resulting data to the controller 30.

Figure 4:
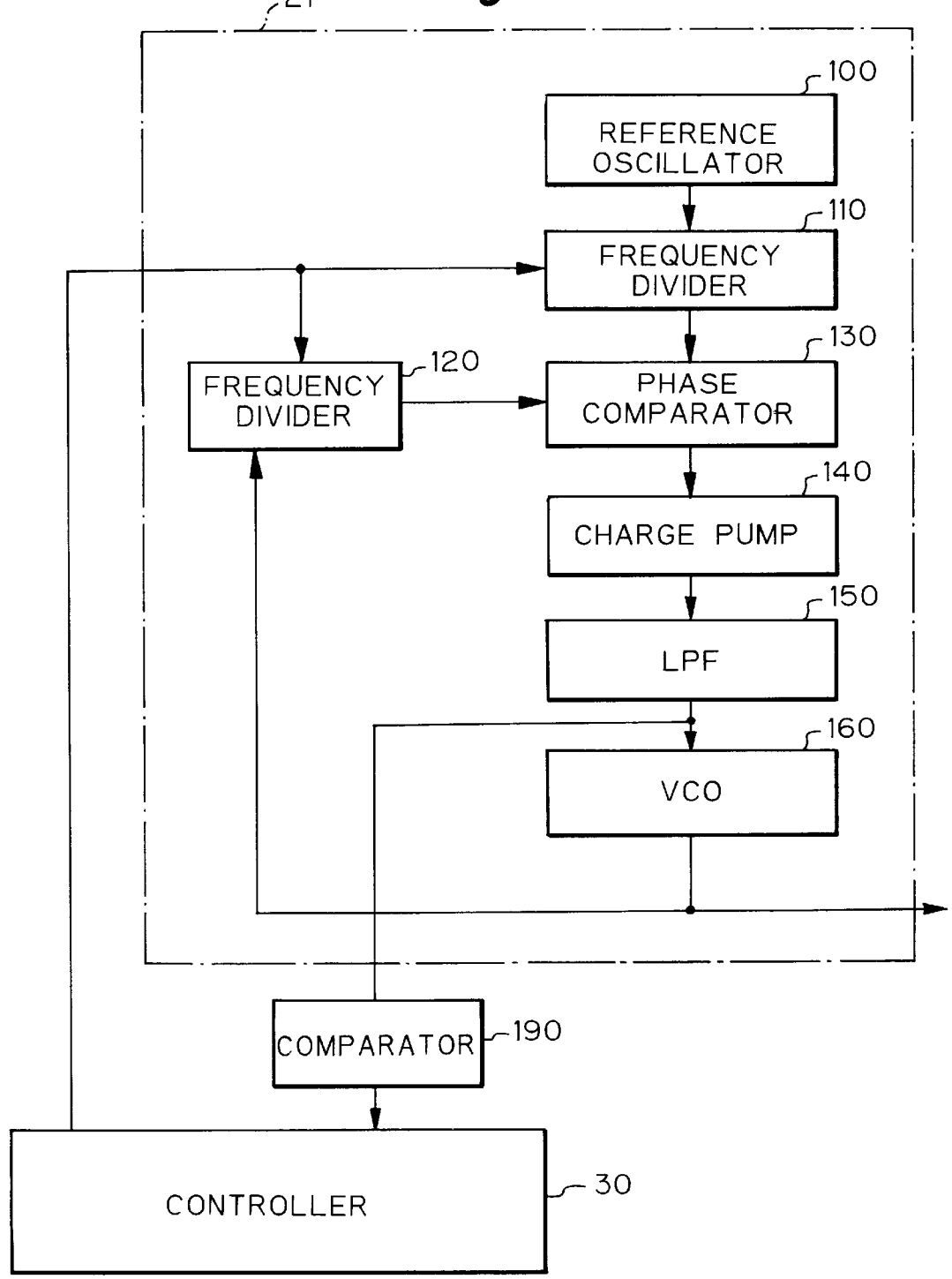

Still another specific configuration of the synthesizer 21 is shown in FIG. 4. As shown, this configuration is similar to the configuration of FIG. 3 except that the ADC 180 is replaced with a comparator 190. The comparator 190 compares the control voltage fed from the LPF 150 to the VCO 160 with a preselected threshold. The output of the comparator 190 connected to the controller 30 goes low or goes high, depending on the result of comparison.

A procedure for identifying the frequency band assigned to the radio pager 10 will be described. To set up a frequency band identification mode in the pager 10, the ROM writer 80 may be connected to the pager 10, or the pager 10 may be operated alone, as follows.

Figure 5:
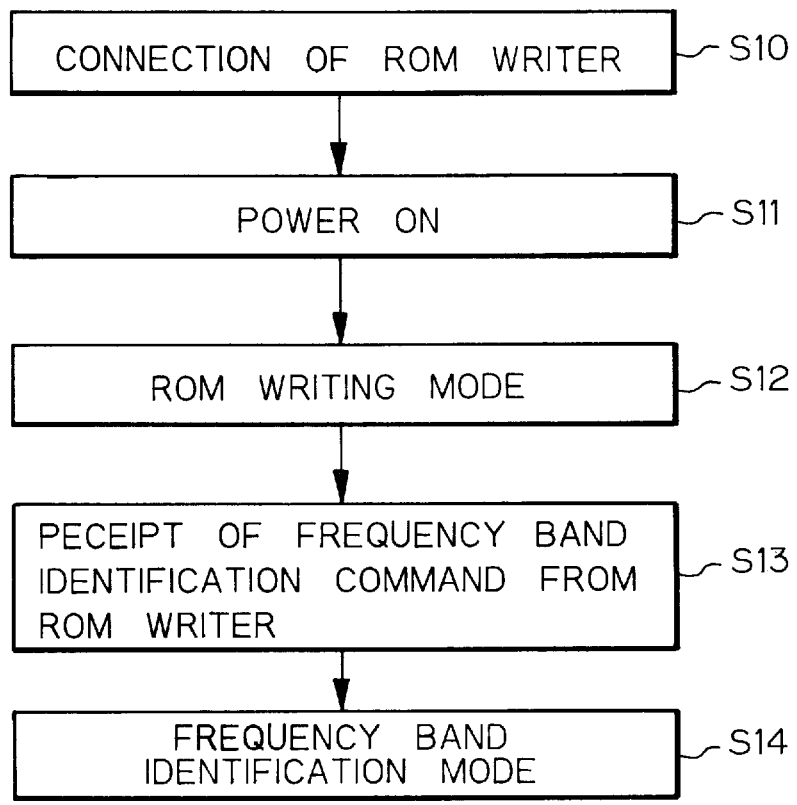
FIG. 5 is a flowchart demonstrating a specific operation of the embodiment up to a step in which a frequency band identification mode is set up with a ROM writer connected to the radio pager.

First, a reference will be made to FIG. 5 for describing the frequency identification procedure using the ROM writer 80. As shown, the ROM writer 80 is connected to the controller 30 of the pager 10 (step S10). When a power switch, not shown, provided on the pager 10 is turned on (step S11), the controller 30 recognizes the connection of the ROM writer 80 and then enters into a ROM writing mode (step S12). Upon receiving a frequency band identification command from the ROM writer 80 (step S13), the controller 30 enters into a frequency identification mode.(step S14).

Figure 6:
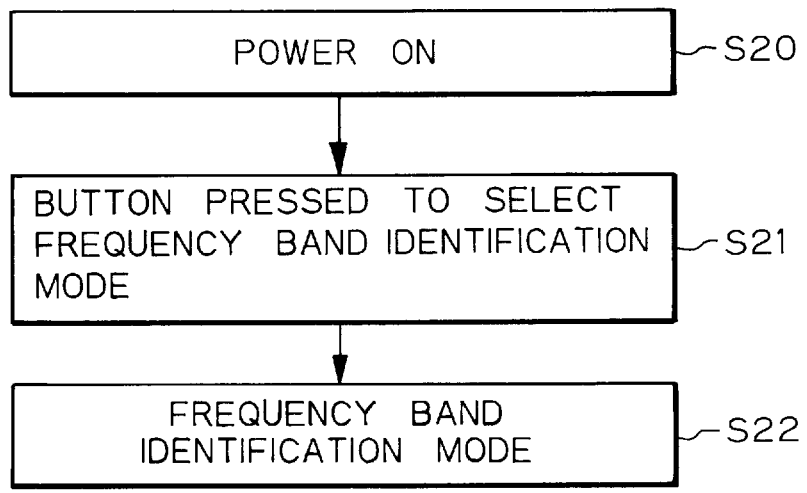
FIG. 6 is a flowchart demonstrating another specific operation of the embodiment up to the step in which the frequency identification mode is set up on the pager itself.

FIG. 6 demonstrates the frequency identification procedure effected on the radio pager 10 itself. As shown, after the power switch of the pager 10 has been turned on (step S20), the previously mentioned push-button switch included in the operation panel 60 is pressed in order to select the frequency band identification mode (step S21). Then, the controller 30 enters into the frequency band identification mode (step S22). The operation of the pager 10 in such a frequency band identification mode slightly differs, depending on the configuration of the synthesizer 21, as follows.

Figure 7:
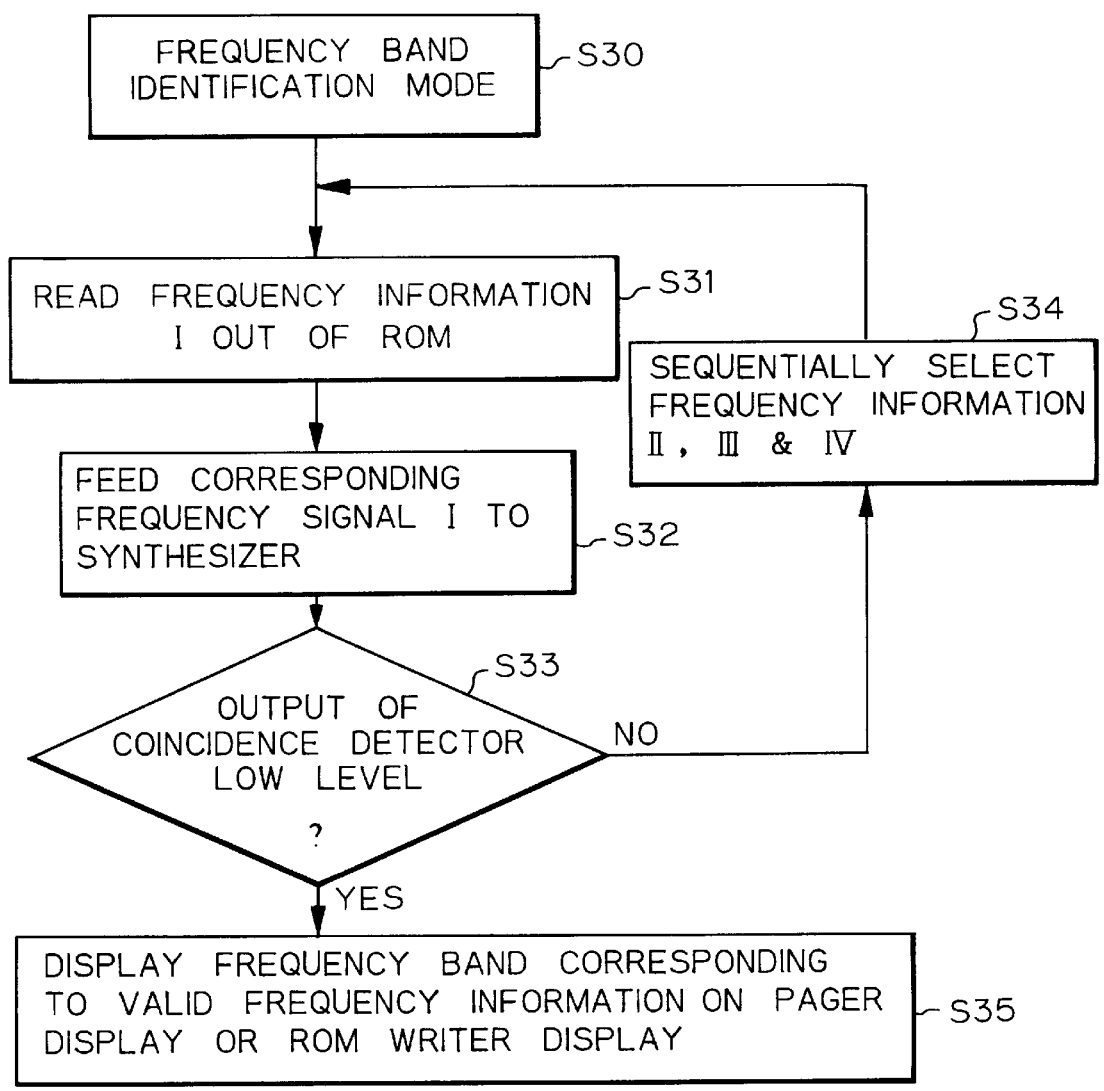

FIG. 7 demonstrates the operation to be executed when the synthesizer 21 has the configuration shown in FIG. 2. In this case, the ROM 40 should only store one channel of frequency information for each of the plurality of frequency bands. Usually, the one channel of frequency information corresponds to the center frequency of the individual frequency band. On entering into the frequency band identification mode (step S30), the controller 30 reads frequency information I associated with any one of the frequency bands out of the ROM 40 (step S31). Then, the controller 30 feeds a frequency signal corresponding to the information I to the synthesizer 21 (step S32). In response, the synthesizer 21 starts operating. After the operation of the synthesizer 21 has been stabilized, the output of the coincidence detector 170 goes low if the frequency has been locked in response to the information I or goes high if otherwise (step S33). When the output of the coincidence detector 170 is in its high level, the controller 30 determines that the synthesizer 21 remains inactive to the information I. In this case, the controller 30 reads the next frequency information II out of the ROM 40 and feeds a corresponding frequency signal to the synthesizer 21 (steps S34, S31 and S32). The controller 30 repeats the loop consisting of the steps S31–S34, i.e., sequentially selects the successive frequency information II, III and IV until the output of the coincidence detector 170 goes low. If the output of the coincidence detector 170 is in its low level, the controller 30 determines that the synthesizer 21 has been activated by the frequency signal. Then, the controller 30 displays the frequency band corresponding to the valid frequency information on the display 50 or on a display, not shown, provided on the ROM writer 80. This informs the operator of the receipt frequency band assigned to the pager 10 (step S35).

Figure 8:
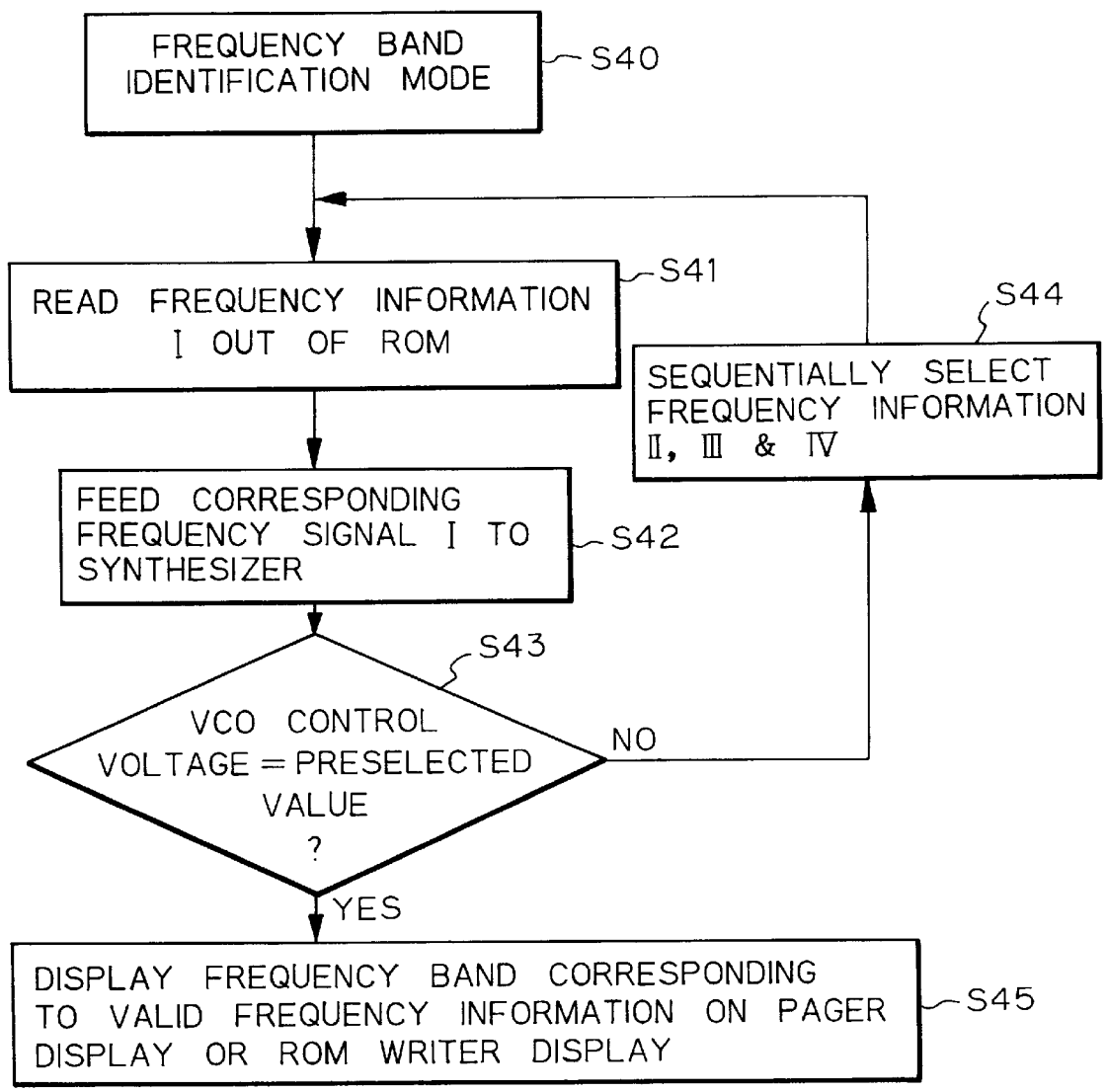

FIG. 8 shows the operation to be executed when the synthesizer 21 has the configuration shown in FIG. 3. Again, the ROM 40 should only store one channel of frequency information for each of the plurality of frequency bands. On entering into the frequency band identification mode (step S40), the controller 30 reads the frequency information I associated with any one of the frequency bands out of the ROM 40 (step S41). Then, the controller 30 feeds a frequency signal corresponding to the information I to the synthesizer 21 (step S42). In response, the synthesizer 21 starts operating. After the operation of the synthesizer 21 has been stabilized, the control voltage fed from the LPF 150 to the VCO 160 is also fed to the ADC 180. The ADC 180 digitizes the control voltage and delivers the resulting data to the controller 30. The synthesizer 21 is so constructed as to output a preselected value only when the frequency information corresponding to the frequency signal fed to the synthesizer 21 belongs to the frequency band assigned to the RF section 20. When the output of the ADC 180 is not the preselected value, the controller 30 determines that the synthesizer 21 remains inactive to the information I. In this case, the controller 30 reads the next frequency information II out of the ROM 40 and feeds a corresponding frequency signal to the synthesizer 21 (steps S44, S41 and S42). The controller 30 repeats the loop consisting of the steps S41–S44 until the output of the ADC 180 coincides with the preselected value. If the output of the ADC 180 is the preselected value, the controller 30 determines that the synthesizer 21 has been activated by the frequency signal. Then, the controller 30 displays the frequency band corresponding to the valid frequency information on the display 50 or on a display, not shown, provided on the ROM writer 80. This informs the operator of the receipt frequency band assigned to the pager 10 (step S45).

FIG. 9 shows the operation to be executed when the synthesizer 21 has the configuration shown in FIG. 4. In this case, the ROM 40 stores two channels of frequency information for each of the plurality of frequency bands; the two channels are an L channel and an H channel respectively lower than and higher than the center frequency of the individual frequency band. On entering the frequency band identification mode (step S50), the controller 30 reads the frequency information I corresponding to the L channel of any one of the frequency bands out of the ROM 40 (step S51) and sends a corresponding frequency signal to the synthesizer 21 (step S52). In response, the synthesizer 21 starts operating. After the operation of the synthesizer 21 has been stabilized, the control voltage fed from the LPF 150 to the VCO 160 is also fed to the comparator 190. The output of the comparator 190 connected to the controller 30 goes low or goes high, depending on whether the input control voltage is higher or lower than a control voltage to appear when the synthesizer 21 operates at the center frequency of the set frequency band. Specifically, the output of the comparator 190 goes low if the synthesizer 21 operates at the frequency corresponding to the L channel of the frequency band or goes high if it operates at the frequency corresponding to the H channel of the same (step S53). When the output of the comparator 90 is in its high level in response to the L channel frequency information, the controller 30 reads the frequency information III corresponding to the L channel of another frequency band and sends a corresponding frequency signal to the synthesizer 21 (steps S57, S51 and S52). The controller 30 repeats such a procedure until the output of the comparator 190 goes low. When the output of the comparator 190 is in its low level in response to the H channel frequency information, the controller 50 selects another frequency band (steps S56 and S57) and then repeats the steps S51–S57. When the output of the comparator 190 is in its high level in response to the H channel frequency information, the controller 30 determines that the synthesizer 21 has been activated by the frequency signal. Then, the controller 30 displays the frequency band corresponding to the valid frequency information on the display 50 or on the display provided on the ROM writer 80. This informs the operator of the receipt frequency band assigned to the pager 10 (step S58).

In summary, in accordance with the present invention, a radio pager includes a non-volatile memory storing frequency information for each of a plurality of frequency bands for the confirmation of a frequency band. The frequency information are sequentially read out of the memory while frequency signals respectively corresponding to the information are sequentially fed to a frequency synthesizer, until frequency lock detecting means detects a frequency lock. The frequency band to which the locked frequency belongs is determined to be the frequency band assigned to the radio pager and is reported to the operator. Therefore, even before frequency information for allowing the synthesizer to output a desired oscillation frequency corresponding to a reception frequency is written to the pager and when a frequency band particular to the pager is not labeled on the pager body, the operator can see the frequency band easily. This prevents the operator from writing frequency information in the ROM of an inadequate radio pager to which a desired frequency band is not assigned.

Various modifications will become possible for those skilled in the art after receiving the teachings of the present disclosure without departing from the scope thereof.

What is claimed is:

1. A radio pager adaptive to a plurality of frequency bands for identifying and reporting to a user a frequency band assigned to the radio pager before frequency information for producing a desired oscillation frequency corresponding to a reception frequency has been stored in the radio pager by an external source, said radio pager comprising:

a radio section including a frequency synthesizer adaptive to a particular frequency band;

a non-volatile memory for storing frequency information for confirmation for each of a plurality of frequency bands;

frequency lock detecting means for determining whether the oscillation frequency of said frequency synthesizer has been locked at a frequency corresponding to a frequency signal input to said frequency synthesizer; and control means for determining and reporting to a user a frequency band assigned to the radio pager before frequency information for producing a desired oscillation frequency corresponding to a reception frequency has been stored in the radio pager by an external source, said control means sequentially reading said frequency information of the plurality of frequency bands from said non-volatile memory and providing said frequency signal representative of said frequency information to said frequency synthesizer until said frequency lock detecting means detects that the oscillation frequency of said frequency synthesizer has been locked in response to said frequency signal, and reporting the frequency band to which the lock frequency belongs as the frequency band assigned to the radio pager.

2. A radio pager as claimed in claim 1, wherein to determine if the frequency has been locked, said frequency lock detecting means determines whether the phases of a frequency-divided reference oscillation frequency and a frequency-divided output oscillation signal are fully coincident.

3. A radio pager as claimed in claim 1, wherein to determine if the frequency has been locked, said frequency lock detecting means determines whether a control voltage input to a VCO, which oscillates at a frequency corresponding to said control voltage, is coincident with a preselected value.

4. A radio pager as claimed in claim 3, wherein said nonvolatile memory stores two channels of frequency information for each of the plurality of frequency bands, one channel being higher than a center frequency of the respective frequency band and the other channel being lower than said center frequency, and wherein said frequency lock detecting means determines whether the control voltage input to said VCO is higher or lower than a voltage corresponding to when the frequency is locked at the center frequency of a preselected one of the frequency bands, and wherein said control means determines, when said frequency lock detecting means detects both a value higher than said voltage and a value lower than said voltage in response to said two channels of frequency information of a same frequency band, that said frequency band is a frequency band assigned to said radio pager.

* * * * *